US009676891B2

(12) United States Patent
Boday et al.

(10) Patent No.: US 9,676,891 B2
(45) Date of Patent: *Jun. 13, 2017

(54) SYNTHESIS OF DYNAMIC COVALENT 3D CONSTRUCTS

(71) Applicant: International Business Machines Corporation, Armonk, NY (US)

(72) Inventors: Dylan J. Boday, Tuscon, AZ (US); Jeannette M. Garcia, San Jose, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/466,494

(22) Filed: Aug. 22, 2014

(65) Prior Publication Data
US 2016/0053052 A1    Feb. 25, 2016

(51) Int. Cl.
C08G 8/16        (2006.01)
C08G 12/04       (2006.01)
C08G 12/06       (2006.01)
C08G 12/08       (2006.01)
C08G 73/06       (2006.01)

(52) U.S. Cl.
CPC .......... *C08G 12/043* (2013.01); *C08G 12/06* (2013.01); *C08G 12/08* (2013.01); *C08G 73/0638* (2013.01)

(58) Field of Classification Search
CPC ................ H01L 51/0067; H01L 51/0072
USPC ..................................... 528/53, 186
See application file for complete search history.

(56) References Cited

U.S. PATENT DOCUMENTS

| 2,889,277 A | 6/1959 | Hughes |
| 3,340,232 A | 9/1967 | Smith et al. |
| 3,598,748 A | 8/1971 | Hirosawa |
| 3,957,742 A | 5/1976 | Kveton |
| 4,106,904 A | 8/1978 | Oude Alink et al. |
| 4,159,253 A | 6/1979 | Grier et al. |
| 4,224,417 A | 9/1980 | Hajek et al. |
| 4,225,481 A | 9/1980 | Wagner |
| 4,246,160 A | 1/1981 | Wagner et al. |

(Continued)

FOREIGN PATENT DOCUMENTS

| CN | 101265255 A | 9/2008 |
| EP | 2636697 A1 | 9/2013 |

(Continued)

OTHER PUBLICATIONS

Henri Ulrich et al., Reaction of Chloromethyl Ether with Primary Amines, May 1961, pp. 1637-1638.

(Continued)

*Primary Examiner* — Shane Fang
(74) *Attorney, Agent, or Firm* — Patterson + Sheridan, LLP

(57) ABSTRACT

Methods and materials for preparing a covalent 3D nano-object are provided. A diamine or triamine monomer and a monoamine terminated precursor may be reacted to form a star polymer material. A cross-linking polymerization process may in a nanogel core with the monoamine terminated precursor covalently linked to the nanogel core. The covalent 3D nano-object may comprise HT, PHT, HA, and/or PHA materials.

15 Claims, 5 Drawing Sheets

(56) References Cited

U.S. PATENT DOCUMENTS

| | | | |
|---|---|---|---|
| 4,301,262 | A | 11/1981 | Wagner et al. |
| 4,340,453 | A | 7/1982 | Noomem |
| 4,877,451 | A | 10/1989 | Winnik et al. |
| 5,112,796 | A | 5/1992 | Iannicelli |
| 5,674,377 | A | 10/1997 | Sullivan, III et al. |
| 5,830,243 | A | 11/1998 | Wolak et al. |
| 7,384,434 | B2 | 6/2008 | Malfer et al. |
| 8,640,866 | B1 | 2/2014 | Dow |
| 9,243,107 | B2* | 1/2016 | Hedrick ............... C08G 65/00 |
| 9,271,498 | B2* | 3/2016 | Boday .................. B05D 3/104 |
| 2008/0268371 | A1* | 10/2008 | Taguchi ................. B41C 1/05 430/270.1 |
| 2009/0039018 | A1 | 2/2009 | Jordi et al. |
| 2009/0247709 | A1 | 10/2009 | Ishida et al. |
| 2010/0107476 | A1 | 5/2010 | Cosimbescu |
| 2011/0070376 | A1 | 3/2011 | Wales et al. |
| 2012/0049308 | A1 | 3/2012 | Nishimura et al. |
| 2015/0104579 | A1 | 4/2015 | Hedrick et al. |
| 2016/0046831 | A1* | 2/2016 | Boday .................. B33Y 70/00 264/401 |

FOREIGN PATENT DOCUMENTS

| | | | | |
|---|---|---|---|---|
| GB | | 928112 | A | 6/1963 |
| GB | | 1531578 | A | 11/1978 |
| JP | | 64066660 | A | 7/1987 |
| JP | | 2010005611 | A | 1/2010 |
| JP | | 2010077245 | A | 4/2010 |
| WO | | 0166614 | A2 | 9/2001 |
| WO | WO | 01-66614 | * | 9/2001 ............ C08G 12/00 |
| WO | | 0198388 | A1 | 12/2001 |
| WO | | 0226849 | A1 | 4/2002 |
| WO | | 2009157426 | A1 | 12/2009 |
| WO | | 2011005258 | A1 | 1/2011 |
| WO | | 2015195911 | A1 | 12/2015 |

OTHER PUBLICATIONS

Hemant S. Patel et al., Studies on Synthesis and Characterization of some Novel Aromatic Copolyesters based on s-Triazine, Iranian Polymer Journal, vol. 14, No. 12, 2005, pp. 1090-1098.

Fabian Suriano et al., Functionalized cyclic carbonates: from synthesis and metal-free catalyzed ring-opening polymerization to applications, Polymer Chemistry, The Royal Society of Chemistry, 2011, Accepted Aug. 13, 2010, pp. 528-533.

Wang Yulan et al., Synthesis and Properties of Poly-1, 3, 5-Triazines, Polymer Communications, No. 2, 1984, pp. 117-123.

John Markoff, Error at IBM Lap Finds New Family of Materials, New York Times, May 15, 2014, 4 pages.

Jeanette M. Garcia et al., Recyclable, Strong Thermosets and Organogels via Paraformaldehyde Condensation with Diamines, Science AAAS, vol. 344, May 16, 2014, pp. 732-735.

D.R. Anderson et al., Thermally resistance polymers containing the s-triazine ring, Journal of Polymer Science Part A-1: Polymer Chemistry, vol. 4, Issue 7, pp. 1689-1702.

T. Okita, Filter method for the determination of trace quantities of amines, mercaptans, and organic sulphides in the atmosphere, Atmospheric Environment (1967), vol. 4, Issue 1, Jan. 1970, pp. 93-102.

Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.

Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-11772; Available online Oct. 19, 2005.

Hiller, et al., "Laser-engravable hexahydrotriazine polymer networks," Mat Res Innovat (2002) 6:179-184.

Oliver, et al. "Measurement of hardness and elastic modulus by; instrumented indentation: Advances in understanding and; refinements to methodology," J. Mater. Res., vol. 19, No. 1, Jan. 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckling-based metrology for measuring; the elastic moduli of polymeric thin films," Nature Materials_Aug. 3, 2004, 545-550;Published online: Jul. 11, 2004.

Ekinci et al., "Preparation, Characterization and H2O2 Selectivity of Hyperbranched Polyimides Containing Triazine", Journal of Polymer Research, 2005, pp. 205-210.

Ke, et al., "Role of non-covalent and covalent interactions in cargo loading capacity and stabilty of polymeric micelles," J. Control Release, Nov. 10, 2014, vol. 193, p. 9-26 (published online Jul. 15, 2014).

Victor W.L. Ng, et al., "Antimicrobial hydrogels: A new weapon in the arsenal against multidrug-resistant infections," Advanced Drug Delivery Reviews; vol. 78, Nov. 30, 2014, pp. 46-62.

Rossmoore, HW et al., Applications and Mode of Action of Formaldehyde Condesatate Biocides. Advances in Applied Microbilolgy, 1988,vol. 33, pp. 223-277.

Kakaneiadifard, et al., "Synthesis and Conformational Analysis of 3,5,7-Triaryl-1,3,5,7-oxatriazocanes", Asian Journal of Chemistry, 2008, 20, 4706-4712.

* cited by examiner

SYNTHESIS OF DYNAMIC COVALENT 3D CONSTRUCTS

BACKGROUND

The present disclosure relates to complex three dimensional (3D) polymer nanoscale materials and methods of forming the same. More specifically, the present disclosure relates to the use of hexahydrotriazine (HT) and hemiaminal (HA) molecules, oligomers, and polymers derived from aromatic, aliphatic, and/or polyether amines to create dynamic covalent 3D nano-objects.

Polymer architecture or chain topology, and the ability to manipulate the macromolecular topology, is generally considered to be important in modern polymer chemistry. Complex polymer architectures may exist as 3D, discrete, nanoscale objects. The 3D nanoscale objects generally exhibit different physical properties when compared to similar linear counterparts of similar composition. Manufacture of 3D polymer architectures has typically been through either of two approaches: covalent or supramolecular.

One example of supramolecular 3D nano-objects are diblock copolymers. If the physical properties of different block comprising the diblock copolymer differ to a requisite degree, the block may microphase separate to form complex morphologies. If the physical properties of the two different blocks in the diblock copolymer are very different, for example, amphiphilic block copolymers, discrete supramolecular block copolymer assemblies may be formed as a result of hydrophobic/hydrophilic interactions. The formation of amphiphilic block copolymer assemblies is driven by the reduction of surface tension between the hydrophobic portion of the amphiphilic molecule in an aqueous environment. As such, the amphiphilic block copolymer assemblies exhibit both hydrophobic and hydrophilic properties.

The most common example of an amphiphilic block copolymer assembly is the micelle. Micelles exist as equilibrium structures defined generally by two parameters: the critical micelle concentration (CMC) and aggregation number ($N_{agg}$). The CMC is the concentration above which the amphiphilic components must be present in the assembly to self-assemble in a polar solvent, such as water. The $N_{agg}$ is the number of molecules that are necessary to form a complete micelle, which controls the size of the nanostructure formed. Micelles as supramolecular nanoscale objects are useful for many applications, including biomedical applications, but may be limited in application due to the reversible nature of micelle formation and the instability of micellular systems at concentrations below the CMC in certain environments.

One example of covalent 3D unimolecular polymer nano-objects are dendrimers. Covalent polymer architectures are an attractive alternative to self-assembled micelles because the covalent architectures are generally more structurally robust and exist as non-equilibrium structures. However, current covalent polymer architectures (i.e. dendrimers) are often derived from complex and economically inefficient traditional organic synthesis. Covalent polymer architectures are useful for various applications due to the molecular size and controllable structure of the polymers, but are often limited in application due to the relative inefficiency associated with formation of the polymer.

Thus, what is needed in the art are improved methods and materials for forming covalent 3D nano-objects.

SUMMARY

In one embodiment, a method of forming a star polymer material is provided. The method includes providing a diamine monomer and a monoamine terminated precursor. The diamine monomer and monoamine terminated precursor may be exposed to an aldehyde material and a star polymer material comprising a PHA or PHT material may be formed.

In another embodiment, a method of forming a star polymer material is provided. The method includes providing a triamine monomer and a monoamine terminated precursor. The triamine monomer and monoamine terminated precursor may be exposed to an aldehyde material and a star polymer material comprising a PHA or PHT material may be formed.

In another embodiment, a method of forming a star polymer material is provided. The method includes preparing a star polymer material comprising reacting a triamine monomer with a monoamine terminated precursor. The star polymer material may include an HA material having a plurality of trivalent hemiaminal groups having the structure

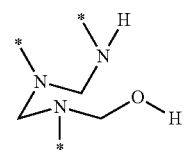 [SMILES: *NCN(*)CN(*)CO]

a plurality of bridging groups having the structure K'—(*)$_{y'}$. y' may be 2 or 3 K' may be a divalent or trivalent radical comprising at least one 6-carbon aromatic ring.

In yet another embodiment, a method of preparing a star polymer material is provided. The method includes preparing a star polymer material comprising reacting a diamine monomer with a monoamine terminated precursor. The star polymer material may include an HT material having a plurality of trivalent hexahydrotriazine groups having the structure

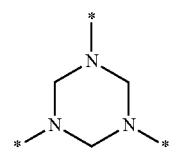

and
a plurality of divalent bridging groups having the structure

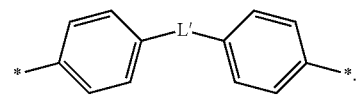

Each divalent bridging group may be bonded to two of the trivalent hexahydrotriazine groups and L' may be a divalent linking group.

DETAILED DESCRIPTION

Figure 1A:
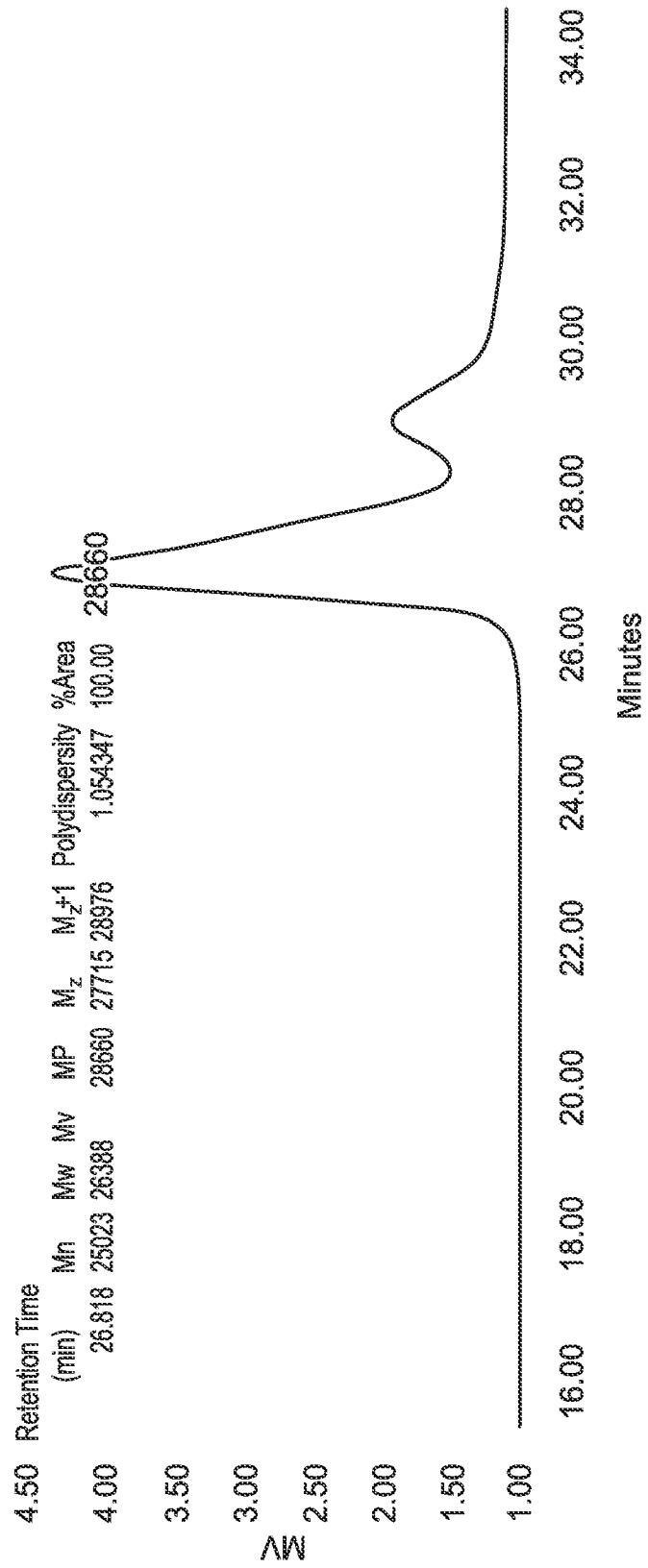
FIGS. 1A-1C illustrate gel phase chromatography chromatograms according to various embodiments described herein.

Hexahydrotriazine (HT) materials and hemiaminal (HA) materials derived from aromatic, aliphatic, and/or polyether diamines and triamines may be used as a platform for creating covalent 3D nano-objects. In certain embodiments, the covalent 3D nano-objects may be star polymer materials. The covalent 3D nano-objects may be prepared from an amine monomer and a monoamine terminated precursor. Examples of amine monomers include aromatic diamines and aliphatic triamines, among others. Examples of monoamine terminated precursors include amine terminated monomers, oligomers, and polymers. The amine monomer may form a "core" of the covalent 3D nano-object and the monoamine terminated precursor may form the "arms" which are covalently linked to the core of the covalent 3D nano-object. The covalent 3D nano-object may include single molecule species, oligomers, and/or polymers (i.e., polyhexahydrotriazine, PHT, polyhemiaminal, PHA). The amine monomer and monoamine terminated precursor may be reacted with an aldehyde (i.e. formaldehyde or paraformaldehyde) to facilitate polymeric cross-linking of the core and covalent linking of the arms of the 3D nano-object.

Star polymer materials may be formed by polymer synthesis to form robust, discrete 3D polymer architectures. Two common approaches to the synthesis of star polymers are the "divergent" and "convergent" approaches. The convergent approach is an "arm-first" approach. In the convergent process, living linear polymeric arms are formed prior to the addition of a multifunctional quenching agent or the addition of a multifunctional cross-linked to link reactive end groups of the arm together to form a static or living nano-gel core. The divergent approach is a "core-first" approach. In the divergent approach, linear arms are grown out form either a multifunctional initiator or a living nano-gel core. A "living" polymerization may generally be defined as a chain polymerization from which the chain transfer and chain termination are absent.

Star polymers formed from static cores via the convergent approach generally have a limited number of arms, for example, 25 arms or fewer. Star polymers formed with a living micro-gel core are generally capable of forming a greater number of arms, such as 40, 50, or even 100 or more arms. Living nano-gel core star polymers may readily be formed with a controllable number of arms branching out. The star polymers may exhibit various morphologies which may be tuned for a number of applications, including biomedical applications, surface modification applications, and lithographical applications, among others.

Covalent 3D nano-objects, and more specifically, star polymers, may be formed by a one step, one pot polymerization process which is kinetically controlled. Various monomers and precursors for forming star polymers may be provided in varying amounts to determine the morphology of the resulting star polymer. In one embodiment, an amine monomer and a monoamine terminated precursor may be provided. Exemplary amine monomers are shown below.

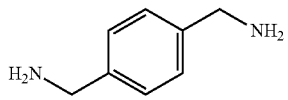

A

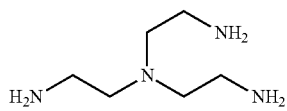

B

An aromatic diamine monomer is shown above and represented as A. The aromatic diamine monomer may be prepared from various materials under suitable process conditions. In one embodiment, the aromatic diamine monomer may be 1,4-Bis(aminomethyl)benzene (BAMB), however it is contemplated that various other aromatic diamines may be utilized. An aliphatic triamine monomer is shown above and represented as B. The aliphatic triamine monomer may be prepared from various materials under suitable process conditions. In one embodiment, the aliphatic triamine monomer may be tris(2-aminoethyl)amine, however it is contemplated that various other aliphatic triamines may be utilized. Suitable amine monomers may also include aliphatic diamines and aromatic triamines. The amine monomers may define the core morphology of a subsequently formed star polymer.

Monoamine terminated precursors may be selected to provide desired morphology to a star polymer. An exemplary monoamine terminated precursor is shown below.

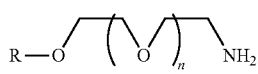

C

A monoamine terminated precursor is shown above and represented as C. The monoamine terminated precursor may be prepared from various materials under suitable process conditions. In one embodiment, the monoamine terminated precursor may be monoamine terminated poly(ethylene glycol) (PEG), however it is contemplated that various other amine terminated monomers, oligomers, and polymers may be utilized. The amine monomers may define the arm morphology of a subsequently formed star polymer. Opposite the amine of the monoamine terminated precursor, a functional group may be provided. The functional group, represented as R, may be selected to provide desired functionality of a resulting star polymer.

Exemplary functional groups which may be linked to the monoamine terminated precursor are shown below. The wavy bond represents where the functional group may be linked to the terminus of the precursor opposite the amine. The below examples of functional groups are not intended to be limiting and may utilized in combination with one another. As such, it is contemplated that various other functional groups providing a desired functionality may be incorporated in the monoamine terminated precursor.

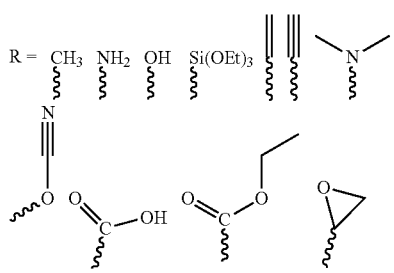

-continued

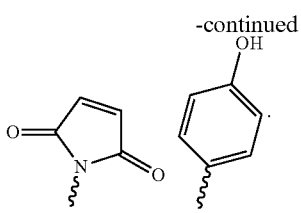

An HT, polyhexahydrotriazine (PHT), HA, or polyhemiaminal (PHA) polymerization process may be performed to form the star polymer material. The amine precursor and monoamine terminated precursor may be may be reacted with an aldehyde (i.e. paraformaldehyde) in a suitable solvent and subsequently cured to enhance covalent cross-linking of the star polymer material via condensation reactions. In one embodiment, the curing may be performed by heating the star polymer material to between about 50° C. and about 280° C., such as greater than about 180° C., for example, about 200° C. In an exemplary embodiment shown below, BAMB and amine terminated PEG are polymerized in paraformaldehyde to form a cross-linked BAMB nano-gel core with functionalized PEG arms.

In the embodiment shown above, the polymerization process was complete in 24 hours and was isolated by precipitation. Gel phase chromatography (GPC) was performed on the resulting material and indicated the formation of a star polymer material. The molecular weight of the PEG precursor was approximately 5 kg/mol and increased to approximately 17-30 kg/mol in the star polymer material. It is believed that steric congestion associated with the PEG arms may limit the size of the core and the total molecular weight of the star polymer. The results also showed formation of a highly cross-linked nano-gel core. It is believed that the nano-gel core of the star polymer material may be in the hemiaminal state. As a result, the polymerization may be reversible, which allows the star polymer material to be recycled. Functionality may also be introduced to the nano-gel core by the addition of a monofunctional amine having a desired functional group. The polymerization process may be kinetically controlled by varying the amounts of the amine monomer and the amine terminated precursor. Generally, a stoichiometric amount of the aldehyde material may be utilized. In this manner, the morphology of the star polymer material may be tuned for desired applications. Examples of materials and processes for forming a star polymer are described below.

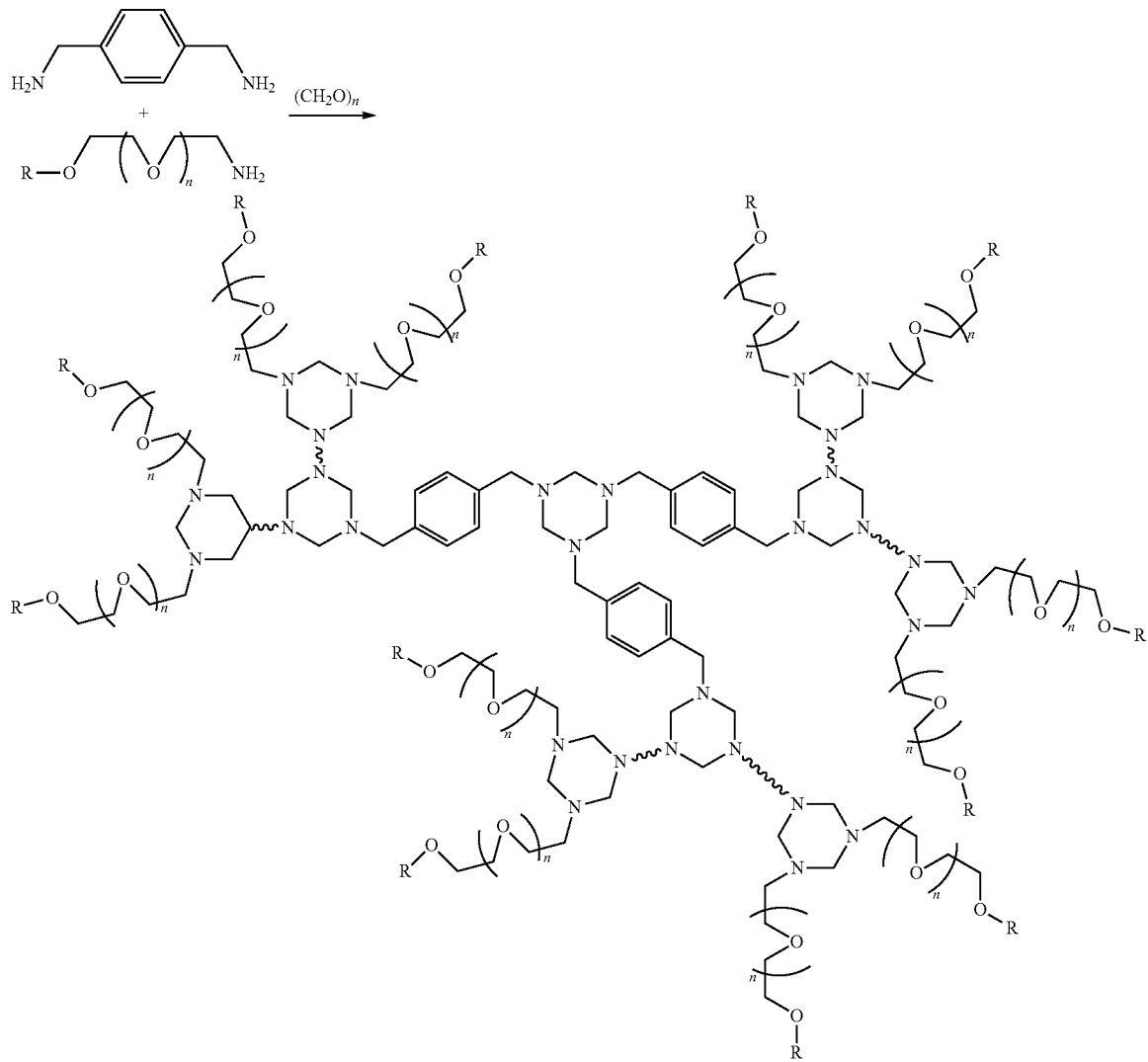

A PHT material suitable for forming an the star polymer material as described herein is a molecule, oligomer, or polymer that has a plurality of trivalent hexahydrotriazine groups having the structure

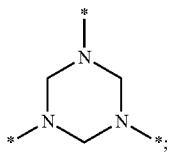

and
a plurality of divalent bridging groups of formula (2):

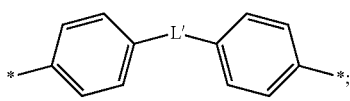

(2)

wherein L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hexahydrotriazine group is covalently linked to a respective one of the divalent bridging groups, and each starred bond of a given bridging group is linked to a respective one of the hexahydrotriazine groups. In one embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

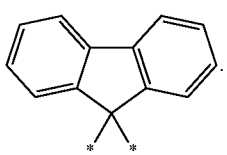 [SMILES: *C1(*)c2ccccc2-c2ccccc21]

For PHT materials with bridging groups of formula (2), the HT may be represented by formula (3):

(3)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (3) is a portion of a different hexahydrotriazine group.

The PHT may also be represented by the notation of formula (4):

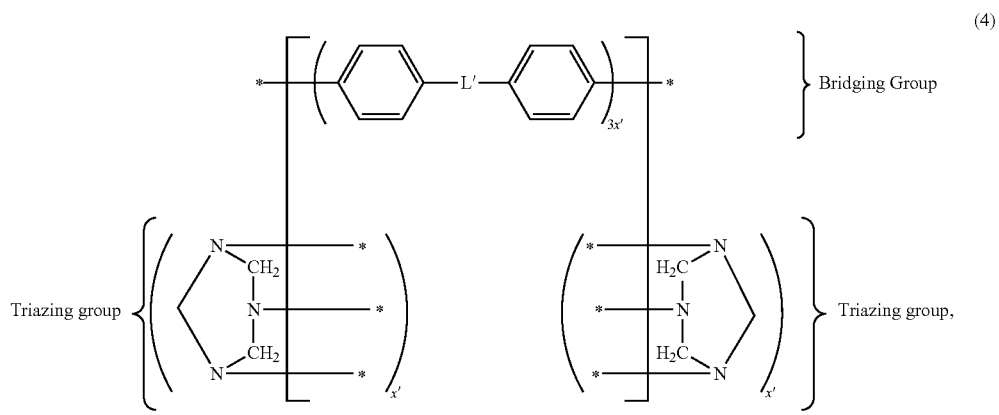

(4)

wherein x' is moles, L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon. Each starred bond of a given hexahydrotriazine group of formula (4) is covalently linked to a respective one of the bridging groups. Additionally, each starred bond of a given bridging group of formula (2) is covalently linked to a respective one of the hexahydrotriazine groups. Polymer molecules may be capped or terminated by a capping group in place of a bridging group in formulas (3) and (4). Examples of capping groups include CH₃, hydrogen atoms, ether groups, thioether groups, and dimethyl amino groups.

The PHT or HT can be bound non-covalently to water and/or a solvent (e.g., by hydrogen bonds).

Exemplary non-limiting divalent bridging groups include:

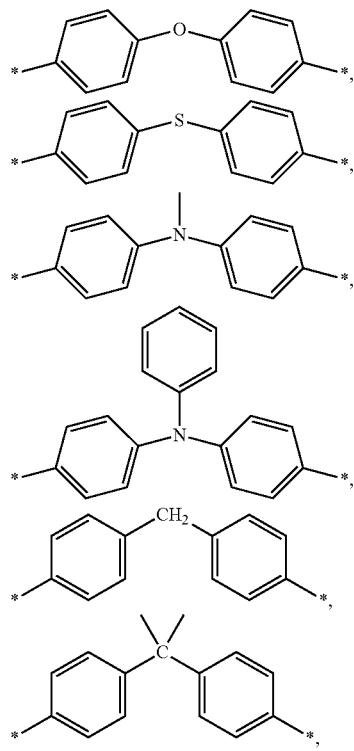

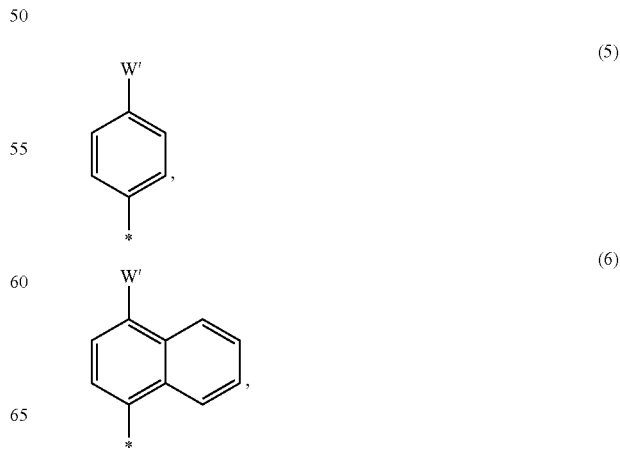

and combinations thereof.

A suitable PHT material may be made by forming a first mixture comprising i) one or more monomers comprising two aromatic primary amine groups, ii) an optional diluent monomer comprising one aromatic primary amine group, iii) paraformaldehyde, formaldehyde, and/or another suitable aldehyde, and iv) a solvent, and heating the first mixture at a temperature of about 50° C. to about 300° C., preferably about 165° C. to about 200° C., thereby forming a second mixture comprising a polyhexahydrotriazine. The heating time at any of the above temperatures can be for about 1 minute to about 24 hours. Diamine monomers suitable for making such PHT materials may have the general structure $H_2N$—Ar-L'-Ar—N—$H_2$, where Ar denotes a benzene ring group and L' is defined as described above. Diluent monomers suitable for including in the reaction are typically primary monoamines $RNH_2$, where the group R bonded to nitrogen has a structure according to formula (5), formula (6), formula (7), and/or formula (8):

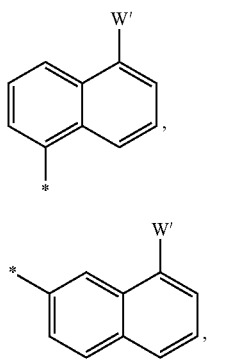

wherein W' is a monovalent radical selected from the group consisting of *—N(R$^1$)(R$^2$), *—OR$^3$, —SR$^4$, wherein R$^1$, R$^2$, R$^3$, and R$^4$ are independent monovalent radicals comprising at least 1 carbon. The starred bonds in formulas (5), (6), (7), and (8) denote bonds with the nitrogen atom of the primary amine monomer. Non-limiting exemplary diluent groups include:

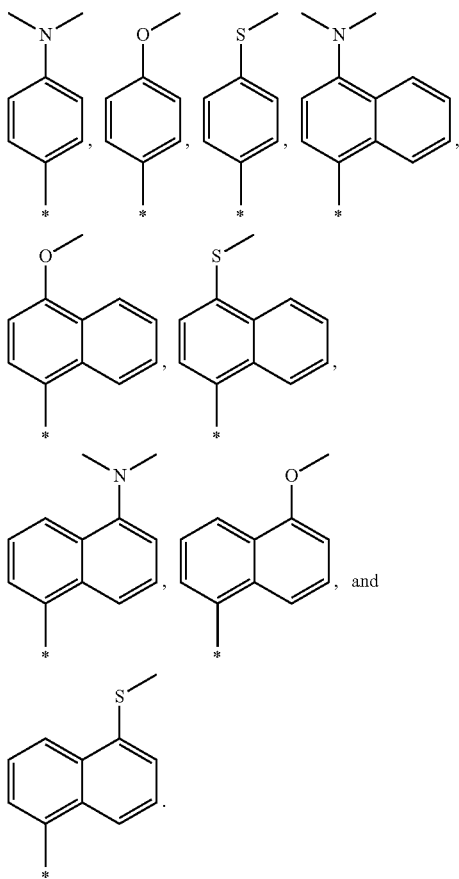

Diluent groups can be used singularly or in combination.

Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

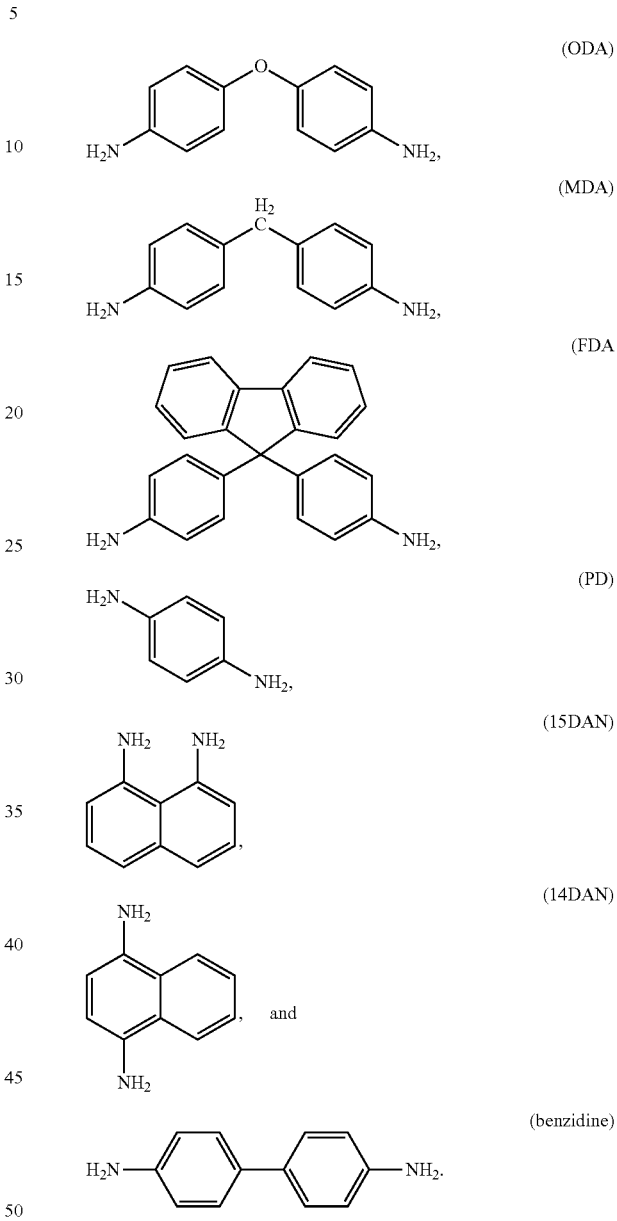

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

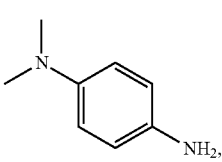

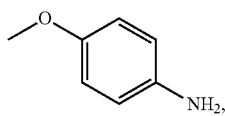
(MOA)

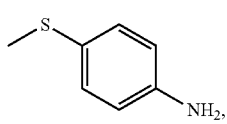
(MTA)

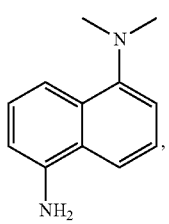
(15DMN)

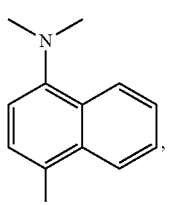
(14DMN)

and

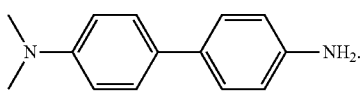
(DMB)

HT and HA materials may be used to cross-link the star polymer material nano-gel core. It should be noted that many diamines will react with aldehydes, such as formaldehyde, to cross-link the star polymer nano-gel core. Alkyl diamines, such as hexane diamine, will also react with formaldehyde to cross-link the star polymer nano-gel core.

A related material that may be used to cross-link the star polymer material is a hemiaminal (HA) material. A polyhemiaminal (PHA) is a crosslinked polymer comprising i) a plurality of trivalent hemiaminal groups of formula (9):

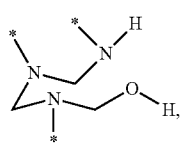
(9)

covalently linked to ii) a plurality of bridging groups of formula (10):

(10), wherein y' is 2 or 3, and K' is a divalent or trivalent radical comprising at least one 6-carbon aromatic ring. In formulas (9) and (10), starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented by formula (11):

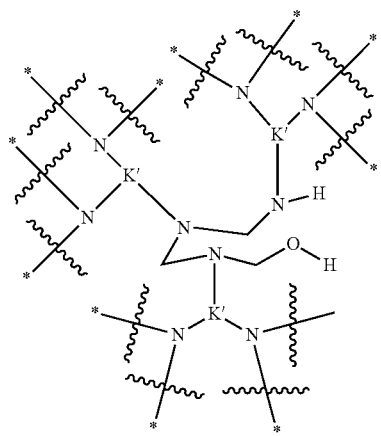
(11)

In this instance, each K' is a trivalent radical (y'=3) comprising at least one 6-carbon aromatic ring. It should be understood that each nitrogen having two starred wavy bonds in formula (11) is a portion of a different hemiaminal group.

The structure of formula (11) can also be represented using the notation of formula (12):

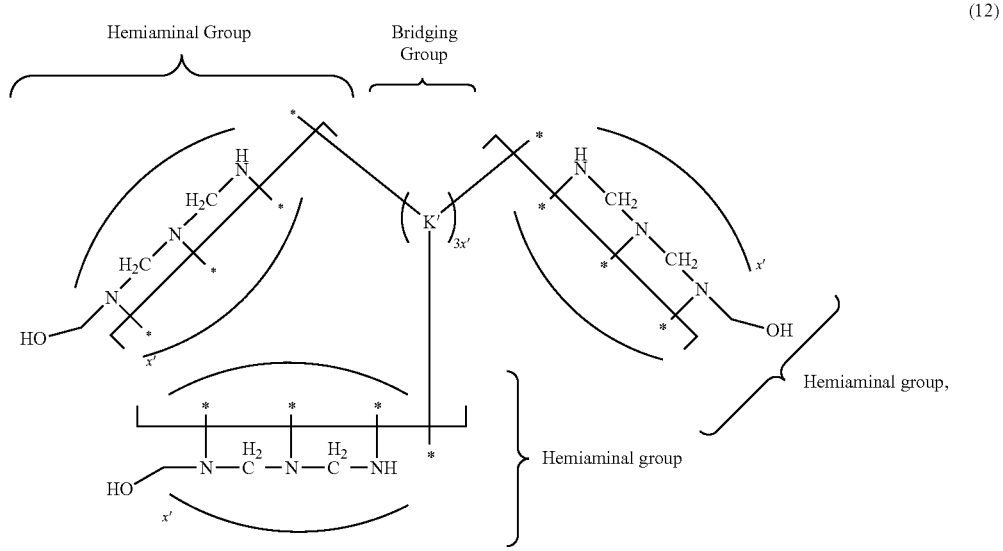

(12)

wherein x' is moles and each bridging group K' is a trivalent radical (y'=3 in formula (10)) comprising at least one 6-carbon aromatic ring. It should be understood that each starred nitrogen bond of a given hemiaminal group of formula (12) is covalently linked to a respective one of the bridging groups K'. Additionally, each starred bond of a given bridging group K' of formula (12) is covalently linked to a respective one of the hemiaminal groups.

Non-limiting exemplary trivalent bridging groups for HA materials include:

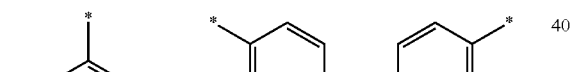

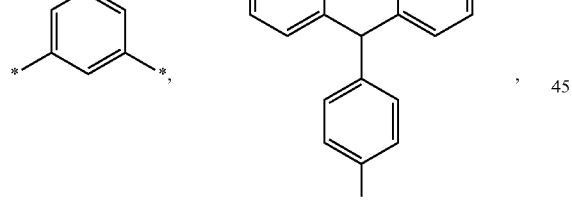

and

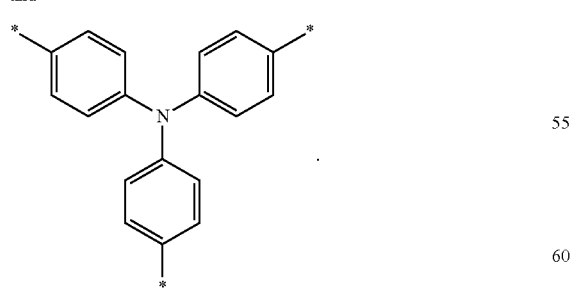

The bridging groups can be used singularly or in combination.

Polyhemiaminals composed of divalent bridging groups K' can be represented herein by formula (13):

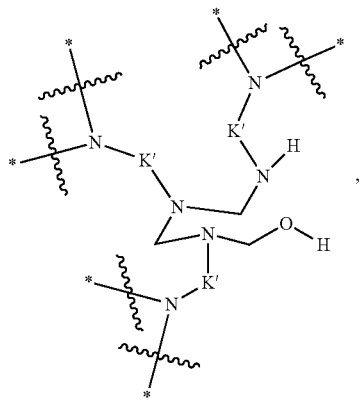

(13)

wherein K' is a divalent radical (y'=2 in formula (10)) comprising at least one 6-carbon aromatic ring. Each nitrogen having two starred wavy bonds in formula (13) is a portion of a different hemiaminal group.

More specific divalent bridging groups have the formula (14):

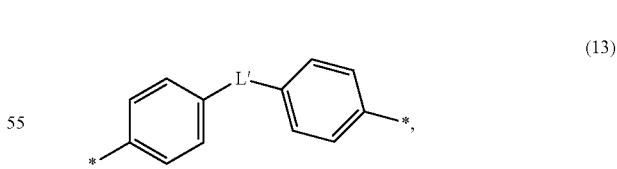

(13)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

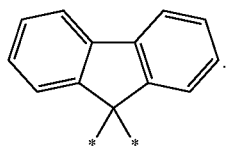

Polyhemiaminals composed of divalent bridging groups of formula (14) can be represented herein by formula (15):

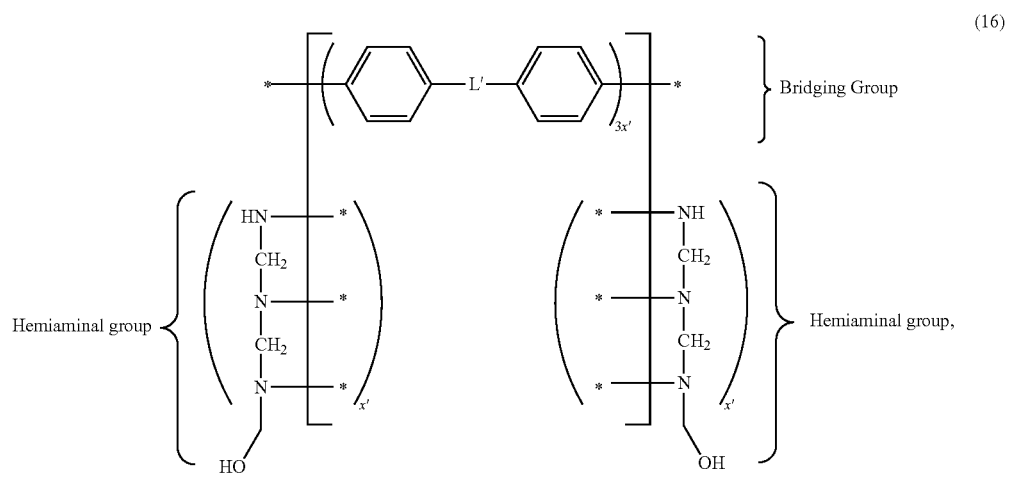

(15)

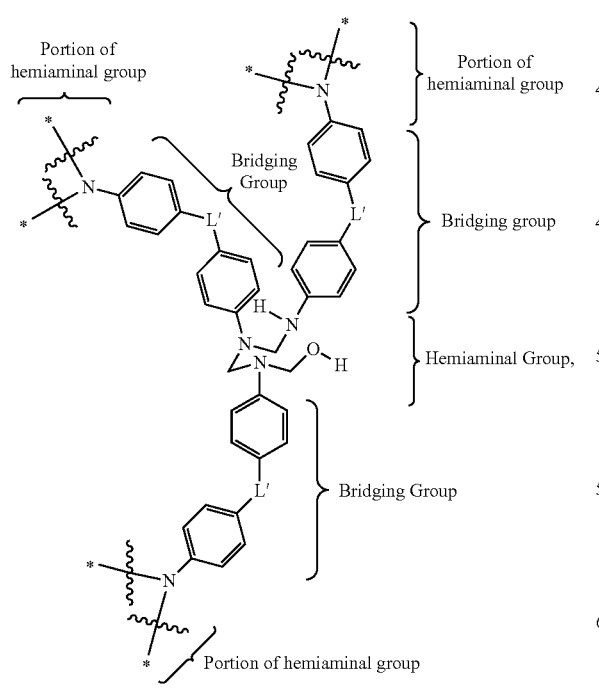

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (15) is a portion of a different hemiaminal group.

The polyhemiaminal of formula (15) can also be represented by the notation of formula (16):

(16)

wherein x' is moles, and L' is a divalent linking group selected from the group consisting of *—O—*, *—S—*, *—N(R')—*, *—N(H)—*, *—R"—*, and combinations thereof, wherein R' and R" independently comprise at least 1 carbon. Each starred nitrogen bond of a given hemiaminal group of formula (16) is covalently linked to a respective one of the bridging groups. Additionally, each starred bond of a given bridging group of formula (16) is covalently linked to a respective one of the hemiaminal groups.

The hemiaminal groups can be bound non-covalently to water and/or a solvent. A non-limiting example is a hemiaminal group that is hydrogen bonded to two water molecules as shown in formula (17):

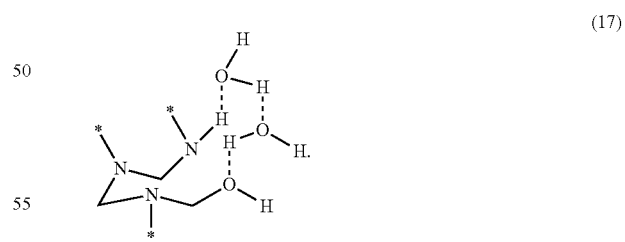

(17)

In some embodiments, a hemiaminal material may form a covalent network with water molecules that may be a polyhemiaminal hydrate (PHH). A PHA material of this form may be made, for example, by reaction of polyethylene glycol oligomers with paraformaldehyde. Such materials may be organogels in some cases.

Typical HT and HA polymers and oligomers, and PHH materials, as described herein may be disassembled in aqueous solutions. HT oligomers and polymers will disassemble into monomers and may dissolve in acid solutions having pH less than about 3, such as less than about 2.5, for example less than about 2.

An HA material suitable for use according to the methods described herein may be made using the same groups of reactants as for the HT materials. The diluent monomers described above may also be used to make HA materials. A method of preparing a polyhemiaminal (PHA) comprising divalent bridging groups comprises forming a first mixture comprising i) a monomer comprising two or more primary aromatic amine groups, ii) an optional diluent monomer comprising one aromatic primary amine group, iii) paraformaldehyde, and iv) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups. The mole ratio of paraformaldehyde:total moles of primary aromatic amine groups (e.g., diamine monomer plus optional monoamine monomer) may be about 1:1 to about 1.25:1, based on one mole or equivalent of paraformaldehyde equal to 30 grams. The solvent can be any suitable solvent. Exemplary solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), N-cyclohexyl-2-pyrrolidone (CHP), N,N'-dimethylpropyleneurea (DMPU), and propylene glycol methyl ether acetate (PGMEA).

A PHT material may be prepared from a PHA material. The PHT can be prepared by heating a solution comprising the PHA at a temperature of at least 50° C., such as about 165° C. to about 280° C. or about 180° C. to about 220° C., for example at about 200° C. for about 1 minute to about 24 hours. Additionally, a mixed PHA/PHT copolymer may be made by partially converting a PHA material to a PHT material. A combination of low conversion temperature, for example about 150° C. to about 165° C., and short conversion time, for example about 1 minute to about 10 minutes, may be used to make a mixed PHA/PHT material.

An exemplary PHA material may be made by reaction of 4,4'-oxydianiline (ODA) with paraformaldehyde (PF). The product is a powder or solid plastic.

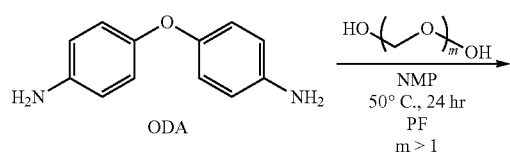

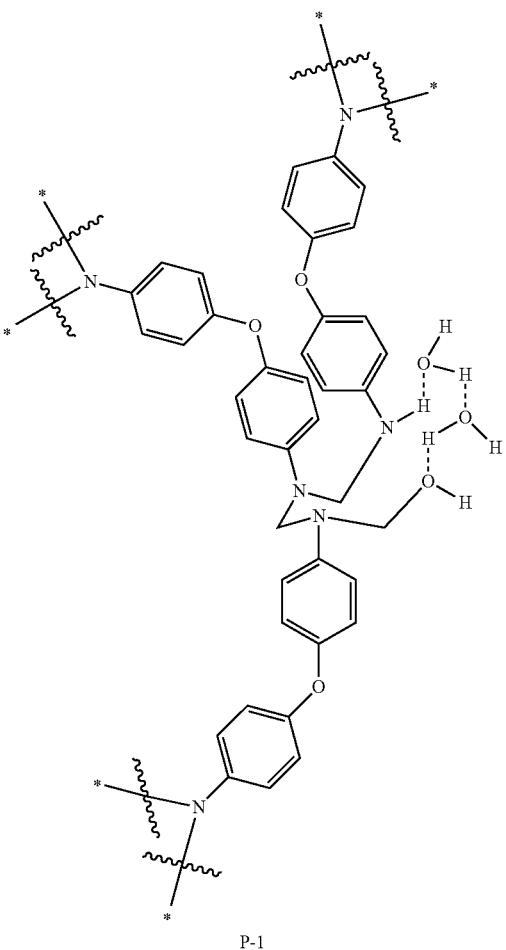

P-1

4,4'-Oxydianiline (ODA, 0.20 g, 1.0 mmol) and paraformaldehyde (PF, 0.15 g, 5.0 mmol, 5 equivalents (eq.)) were weighed out into a 2-Dram vial inside a $N_2$-filled glovebox. N-methylpyrrolidone (NMP, 6.2 g, 6.0 mL, 0.17 M) was added. The vial was capped but not sealed. The reaction mixture was removed from the glovebox, and heated in an oil bath at 50° C. for 24 hours (after approximately 0.75 hours, the polymer begins to precipitate). The polyhemiaminal P-1 was precipitated in acetone or water, filtered and collected to yield 0.22 g, >98% yield as a white solid.

A second exemplary PHA material may be prepared by reaction of 4,4'-methylenedianiline (MDA) with PF:

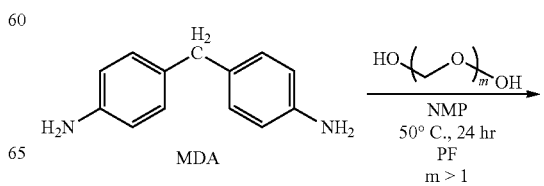

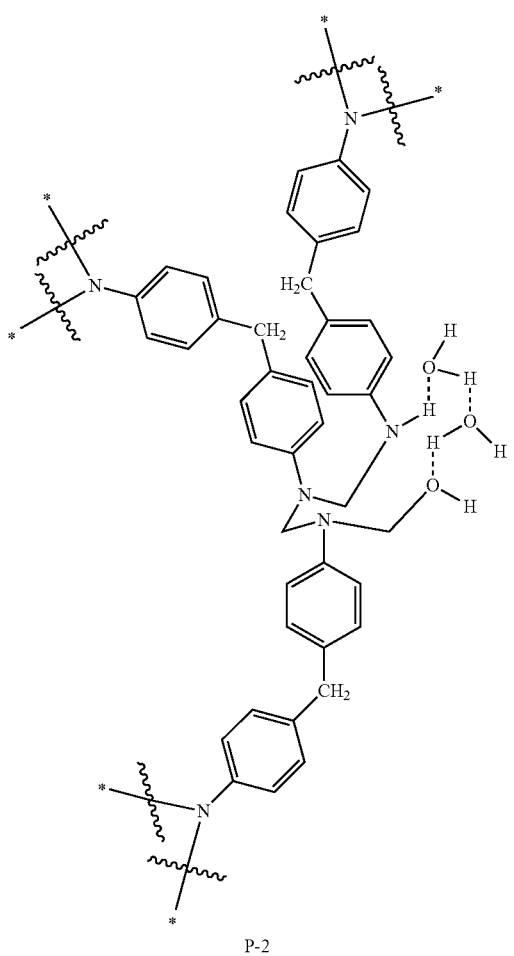

P-2

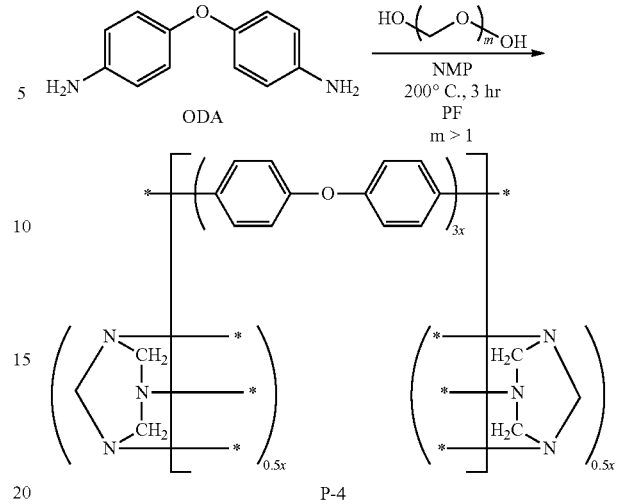

P-4

ODA was substituted with 4,4'-methylenedianiline (MDA) and a mole ratio of MDA to PF of 1:5 was used. Solid yield of 0.15 g, 69%, was an amorphous, insoluble off-white powder.

Exemplary PHA reactions are described above. Various examples of reaction materials and parameter for forming a star polymer having a PHA nano-gel core are provided in Table 1. As a general procedure, monofunctional amine terminated PEG was provided into a flask equipped with a stir bar together with various concentrations of tris(2-aminoethyl)amine and a stoichiometric amount of paraformaldehyde. DMSO was added and the samples were heated to 50° C. for 24 hours. GPC chromatograms showing formation of a star polymer material for each of the examples are shown in FIGS. 1A-1C, respectively.

TABLE 1

Figure 1B:
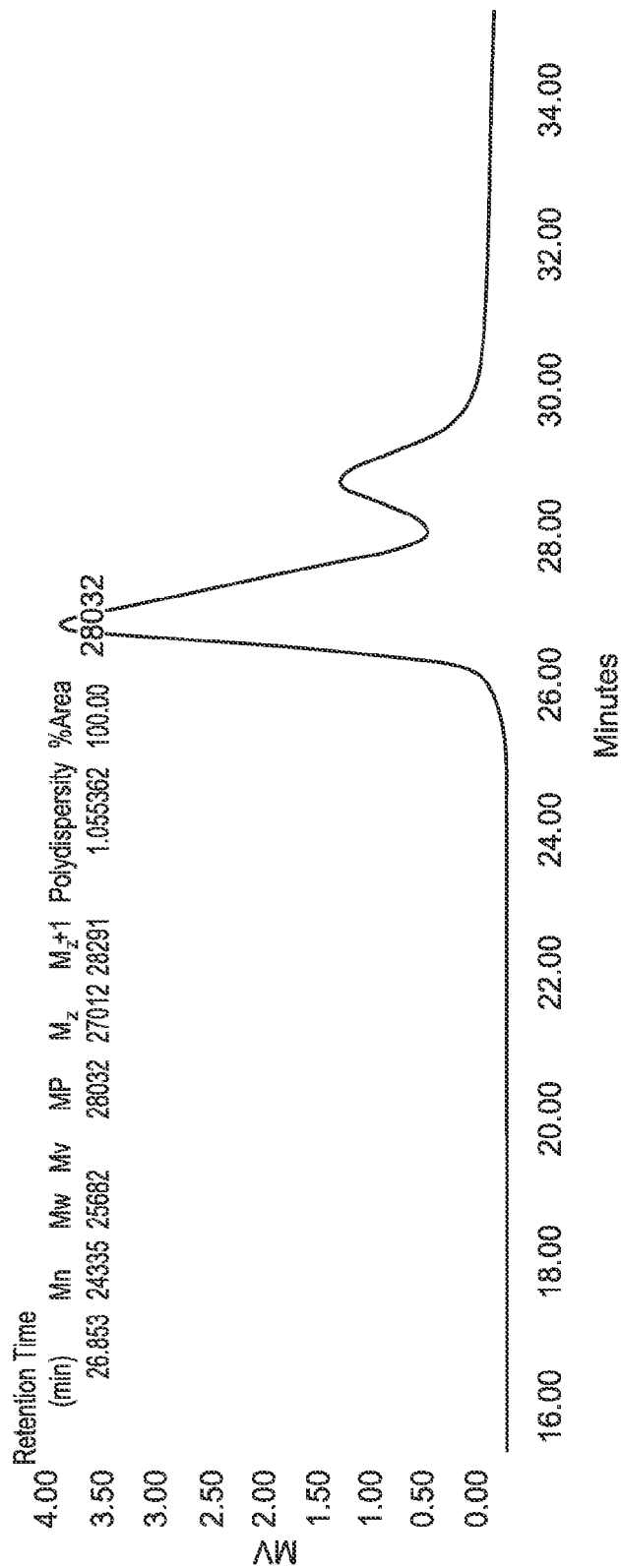
Figure 1C:
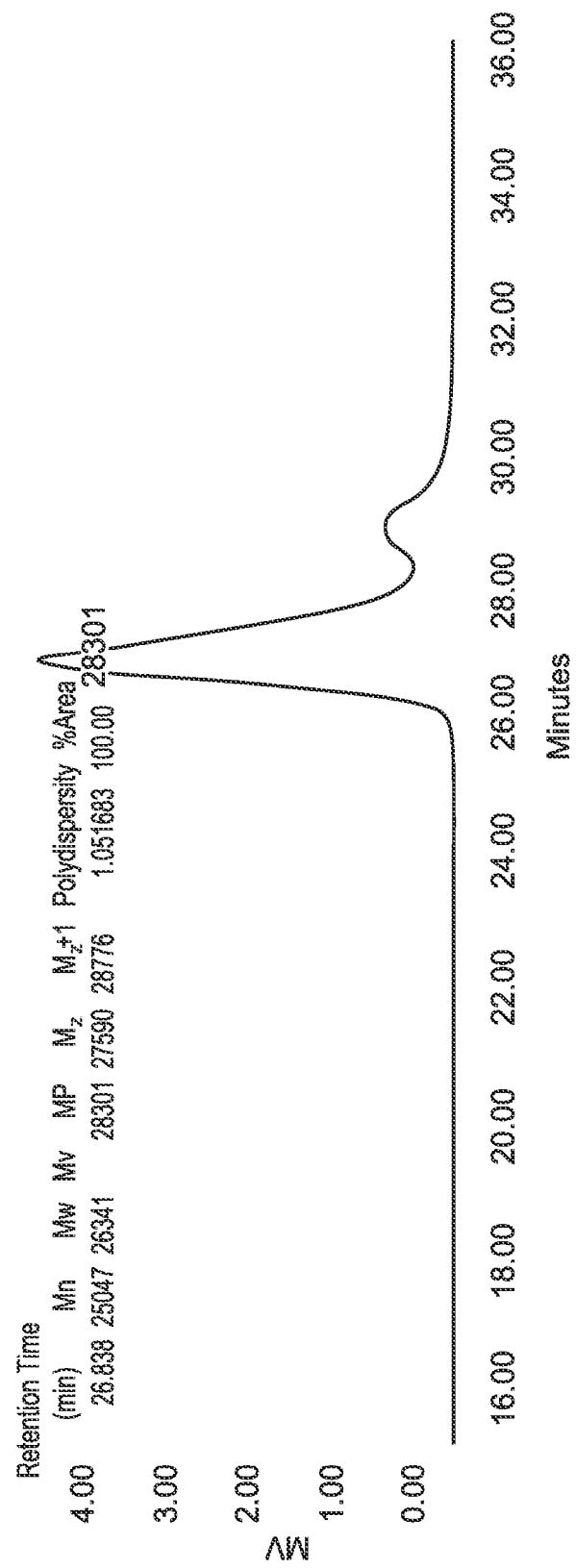

| | PEG | Paraformaldehyde | Tris (2-aminoethyl) amine | DMSO |
|---|---|---|---|---|
| FIG. 1A | 0.1 g, 0.02 mmol | 0.00063 g | 0.00073 g | 1.0 mL |
| FIG. 1B | 0.1 g, 0.02 mmol | 0.00093 g | 0.00146 g | 1.0 mL |
| FIG. 1C | 0.1 g, 0.02 mmol | 0.001 g | 0.002 g | 1.0 mL |

A PHT material may be prepared by reaction of ODA and PF, as follows:

P-4, a polyhexahydrotriazine, was prepared by reaction of 4,4'-oxydianiline (ODA) with paraformaldehyde (PF). ODA (0.20 g, 1.0 mmol) and PF (0.15 g, 5.0 mmol, 2.5 eq.) were weighed out into a 2-Dram vial inside a $N_2$-filled glovebox. NMP (6.2 g, 6.0 mL, 0.17 M) was added. The reaction mixture was removed from the glovebox, and heated in an oil bath at 200° C. for 3 hours (after approximately 0.25 hours, the polymer begins to gel in the NMP). The solution was allowed to cool to room temperature and the polymer was precipitated in 40 mL of acetone, allowed to soak for 12 hours, then filtered and dried in a vacuum oven overnight and collected to yield 0.21 g, 95% yield of P-4 as an off-white solid.

Exemplary PHT reactions are described above. Various examples of reaction materials and parameter for forming a star polymer having a PHT nano-gel core are provided in Table 2. As a general procedure, monofunctional amine terminated PEG was provided into a flask equipped with a stir bar together with various concentrations of BAMB and a stoichiometric amount of paraformaldehyde. DMSO was added and the samples were heated to 50° C. for 24 hours. GPC chromatograms showing formation of a star polymer material for each of the examples are shown in FIGS. 2A-2B, respectively.

TABLE 2

Figure 2A:
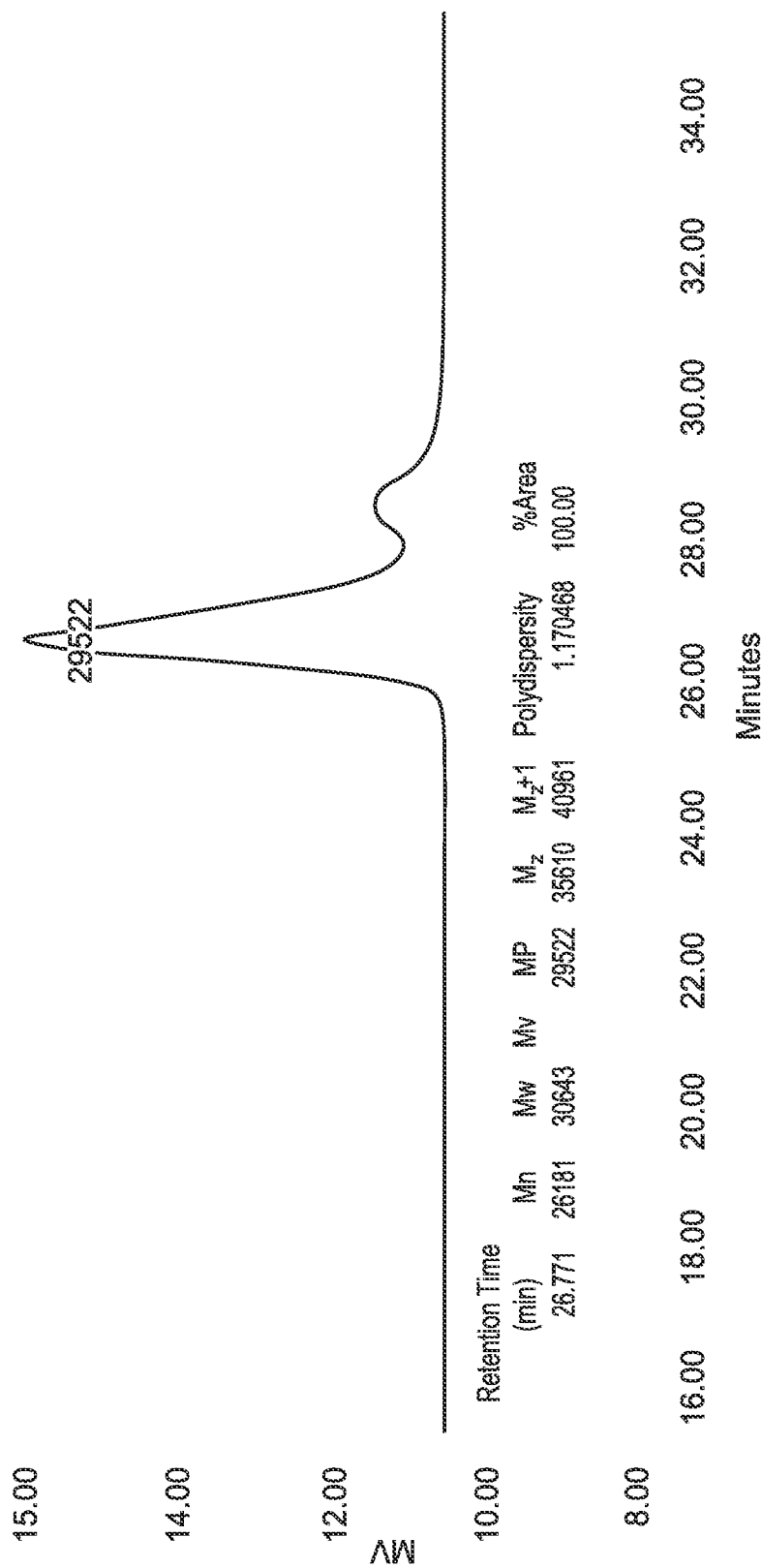
FIGS. 2A-2B illustrate gel phase chromatography chromatograms according to various embodiments described herein.
Figure 2B:
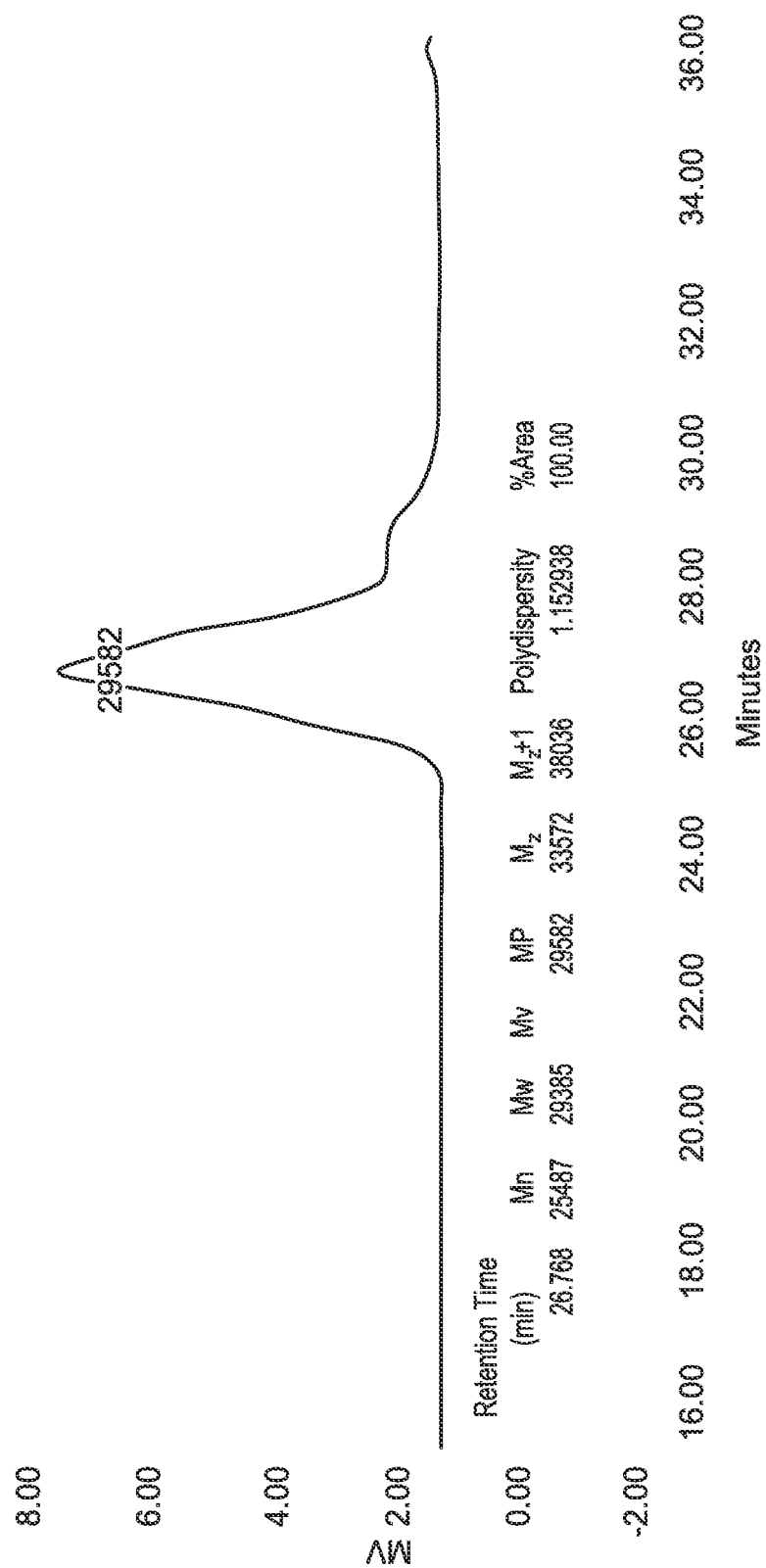

| | PEG | Paraformaldehyde | BAMB | DMSO |
|---|---|---|---|---|
| FIG. 2A | 0.1 g, 0.02 mmol | 0.0012 g | 0.0027 g | 1.0 mL |
| FIG. 2B | 0.1 g, 0.02 mmol | 0.001 g | 0.00136 g | 1.0 mL |

The components of the star polymer material described herein may be included in a composite material that may be used for various applications. Any desired polymer may form a composite material with an HA, HT, or PHH material to provide selected properties. Carbon nanotubes may also form a composite with HA, HT, or PHH materials to provide additional mechanical integrity in various applications of the star polymer material.

The star polymer materials, depending upon the material utilized, may exhibit various advantageous properties. The star polymer materials may be utilized to sequester various material, such as metals, via covalent bonding. The ability to covalently sequester materials may prevent undesirable leeching of the sequestered material. The sequestered materials, again depending on the types of material utilized, may be removed from the star polymer with a basic solution. The star polymer materials may also encapsulate, transport, and deliver various materials in certain environments. For example, monofunctional amines with functional groups designed to facilitate encapsulation via hydrogen bonding, ionic interactions, hydrophobic interactions, etc., may be desirable for the delivery of pharmaceutical materials in biological applications. In this example, the star polymers may be reverted to monomers under certain conditions and the pharmaceutical materials may be delivered to a desired locale within the biological system.

The star polymer materials described herein may also be dispersible in water and may form a monolayer on a surface. It is believed that the monolayer may form as a result of interdigitation between adjacent star polymers dispersed with water. The star polymer monolayer may be removed from a surface with an acidic solution. It is contemplated that the star polymer material may also be self-healing and may exhibit surface regeneration properties.

While the foregoing is directed to example embodiments of the present disclosure, other and further embodiments may be devised without departing from the basic scope thereof, and the scope thereof is determined by the claims that follow.

What is claimed is:

1. A method of forming a star polymer material, comprising:
providing a diamine monomer having two aromatic primary amine groups having the general structure $H_2N$—Ar-L'-Ar—$N$—$H_2$, wherein Ar denotes a benzene ring group and L' is a divalent linking group;
providing a monoamine terminated precursor;
exposing the diamine monomer and the monoamine terminated precursor to an aldehyde material by forming a mixture comprising the diamine monomer, the monoamine terminated precursor, the aldehyde material, and a solvent;
heating the mixture at a temperature of about 50° C. to about 280° C. for about 1 minute to about 24 hours; and
forming a star polymer material comprising a polyhemiaminal or polyhexahydrotriazine material.

2. The method of claim 1, wherein the diamine monomer comprises 1,4-Bis(aminomethyl)benzene.

3. The method of claim 1, wherein the polyhemiaminal or polyhexahydrotriazine material comprises an aromatic bridging group.

4. The method of claim 1, wherein the monoamine terminated precursor comprises a monomer, oligomer, polymer, or combinations thereof.

5. The method of claim 4, wherein the monoamine terminated precursor comprises an amine terminated polyether material.

6. The method of claim 5, wherein the monoamine terminated precursor comprises monoamine poly(ethylene glycol).

7. The method of claim 1, wherein the exposing the diamine monomer and the monoamine terminated precursor to an aldehyde material to form a mixture and heating the mixture comprises forming a cross-linked polyhemiaminal or polyhexahydrotriazine nanogel core with the monoamine terminated precursor covalently linked to the nanogel core.

8. A method of forming a star polymer material, comprising:
preparing a star polymer material comprising reacting a diamine monomer with a monoamine terminated precursor, an aldehyde material, and a solvent to form a mixture, heating the mixture at a temperature of about 50° C. to about 280° C. for about 1 minute to about 24 hours, wherein the star polymer material comprises a hexahydrotriazine material having a plurality of trivalent hexahydrotriazine groups having the structure

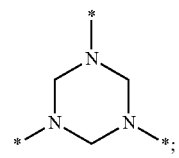

and
a plurality of divalent bridging groups having the structure

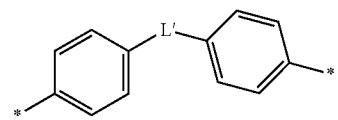

each divalent bridging group bonded to two of the trivalent hexahydrotriazine groups, wherein L' is a divalent linking group.

9. A method of forming a star polymer material, comprising:
providing 1,4-Bis(aminomethyl)benzene;
providing a monoamine terminated precursor;
exposing the 1,4-Bis(aminomethyl)benzene and the monoamine terminated precursor to an aldehyde material to form a mixture;
heating the mixture; and
forming a star polymer material comprising a polyhemiaminal or polyhexahydrotriazine material.

10. The method of claim 9, wherein the polyhemiaminal or polyhexahydrotriazine material comprises an aromatic bridging group.

11. The method of claim 9, wherein the monoamine terminated precursor comprises a monomer, oligomer, polymer, or combinations thereof.

12. The method of claim 11, wherein the monoamine terminated precursor comprises an amine terminated polyether material.

13. The method of claim 12, wherein the monoamine terminated precursor comprises monoamine poly(ethylene glycol).

14. The method of claim 9, wherein forming the star polymer further comprises:
forming the mixture, comprising the 1,4-Bis(aminomethyl)benzene and the monoamine terminated precursor, the mixture having two aromatic primary amine groups having the general structure $H_2N$—Ar-L'-Ar—$N$—$H_2$, wherein Ar denotes a benzene ring group and L' is a divalent linking group, the aldehyde material, and a solvent; and
heating the mixture at a temperature of about 50° C. to about 280° C. for about 1 minute to about 24 hours.

15. The method of claim 9, wherein the exposing the 1,4-Bis(aminomethyl)benzene and the monoamine terminated precursor to an aldehyde material comprises forming a cross-linked polyhemiaminal or polyhexahydrotriazine nanogel core with the monoamine terminated precursor covalently linked to the nanogel core.

* * * * *